United States Patent Office 3,151,044
Patented Sept. 29, 1964

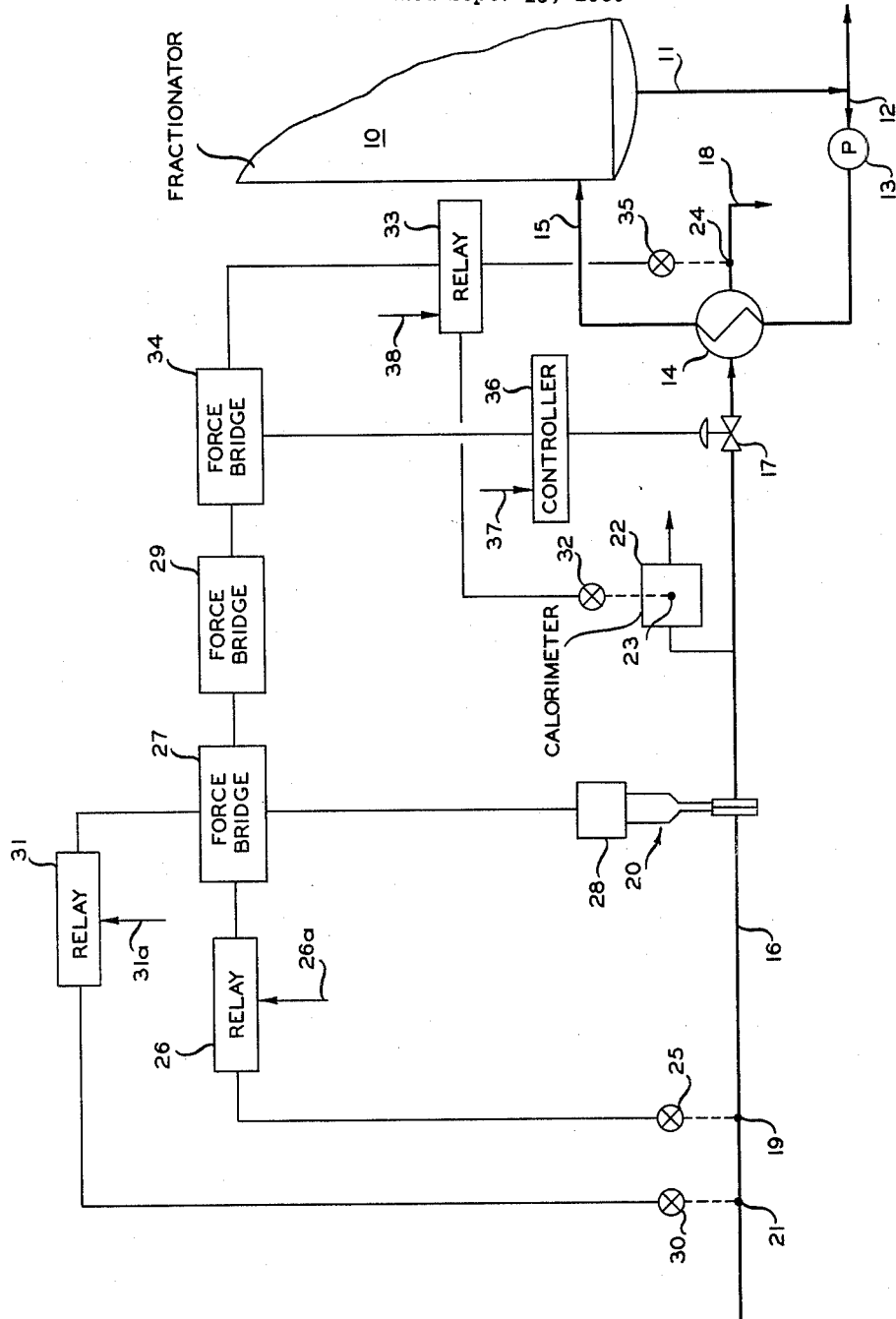

3,151,044
MEASUREMENT AND CONTROL OF HEAT
SUPPLIED BY CONDENSING VAPOR
Minor W. Oglesby, Jr., Bartlesville, Okla., assignor to
Phillips Petroleum Company, a corporation of
Delaware
Filed Sept. 19, 1960, Ser. No. 56,964
6 Claims. (Cl. 202—40)

This invention relates to apparatus and method for determining the heat content of a flowing stream of vapor. In one aspect, this invention relates to a method and means for providing very accurate control of the heat supplied to a heat exchanger by a condensing stream of vapor. In another aspect, this invention relates to a method and apparatus for making a rigorous determination of the heat content of a vapor by automatically measuring properties of the vapor and correlating the measured properties to produce a signal proportional to the heat content. In another aspect, this invention relates to a method and apparatus for controlling the heat supplied to a fractionation tower by automatically making a rigorous computation of the heat given up to the tower by a heat supplying fluid and controlling the flow of said heat supplying fluid to maintain the heat supplied to said tower constant. In another aspect, this invention relates to a method and apparatus for determining the heat supplied by a flowing stream of vapor to a heat exchanger by measuring automatically properties of the vapor flowing into said heat exchanger and the fluid flowing out of said heat exchanger and correlating the measured properties to produce a signal proportional to the heat supplied by said stream to said heat exchanger. In another aspect, this invention relates to a method and apparatus for providing an accurate control of the heat supplied to the reboiler of a fractional distillation apparatus by a flowing stream of steam by measuring automatically properties of the steam flowing into the reboiler and of the fluid flowing out of the reboiler and automatically correlating the measured properties to produce a control signal proportional to the heat supplied by the steam to the reboiler and controlling the flow of steam with the produced signal.

There are many instances where heat is supplied by a condensing vapor through a chemical process or to other heat utilizing zones. It is desirable, in such instances, to control accurately the amount of heat supplied. Such control may be relatively simple when the heat is supplied by a fluid having substantially constant properties during the period of operation. On the other hand, the control becomes relatively ineffective when there are substantial variations in the properties of the fluid. For example, heat may be supplied by a stream of steam which is formed, at least in part, of discharge or waste steam from various sources. Thus, the amount of superheat or the quality of the steam may vary substantially making control of the supply of heat to the desired zone very difficult.

It is an object of the present invention to provide an accurate measurement of the heat content of a flowing stream of vapor. It is another object to provide an accurate control of the amount of heat supplied to a heat utilizing zone by a condensing stream of vapor. It is a further object of this invention to provide an accurate control of the heat supplied to the reboiler of a fractional distillation apparatus by a flowing stream of steam.

Other aspects, objects, and the several advantages of this invention are apparent from a study of the disclosure, the drawing, and the appended claims.

According to the present invention, there are provided method and apparatus for accurately determining the heat content of a flowing stream of vapor by measuring all of the pertinent properties of the stream and combining the measurements to produce an indication or control force which is a function of the heat content. One method, according to this invention, for determining the heat content, of a flowing stream of vapor comprises measuring the temperature, pressure, flow rate and enthalpy and combining signals proportional to these measurements in a manner to determine the heat available per unit of time. This method can be practiced with means for measuring temperature, pressure, and flow rate and producing signals proportional thereto, a throttling calorimeter and means to measure the calorimeter temperature and produce a signal proportional thereto and means for combining the four signals to produce a signal proportional to the heat content of the vapor.

Also, according to this invention, there is provided a method for determining the heat supplied by a flowing stream of vapor to a heat exchanger by measuring the heat content of the stream according to the method described above and determining the heat content of the stream leaving the heat exchanger, subtracting the heat content of the stream leaving from the heat content of the stream entering and controlling the flow of the stream in response to the difference. Also, according to this invention, there are provided method and apparatus for controlling the heat supply to the reboiler of a fractional distillation apparatus by measuring the mass rate of flow of heating vapor to the reboiler, the enthalpy of the vapor entering the reboiler and the enthalpy of the condensed vapor leaving the reboiler and combining these measurements to produce a signal proportional to the heat supplied to the reboiler and controlling the rate of flow of the vapor as a function of the heat supplied.

In the drawing, fractionator 10 is provided with bottom draw-off 11 from which there is provided a branch 12 to pump 13, reboiler 14 and return line 15 to fractionator 10. Heat to the reboiler 14 is provided by steam which flows through steam inlet line 16 and control valve 17. Condensate is removed through pipe 18.

Steam inlet line 16 is provided with pressure sensing element 19, orifice meter 20, temperature sensing element 21 and throttling calorimeter 22. Throttling calorimeter 22 is, in turn, provided with temperature sensing element 23. Pipe 18 is also provided with a temperature sensing element 24.

There is associated with pressure sensing element 19 a pressure transmitter 25 which is connected with adding relay 26 which, in turn, is connected to a force bridge 27. Orifice meter 20 includes a signal transmitter 28 which is connected with force bridge 27. There is a temperature transmitter 30 associated with temperature sensing element 21 and temperature transmitter 30 is connected with adding relay 31 which, in turn, connects with force bridge 27. The output of force bridge 27 is fed as input to force bridge 29. Temperature transmitter 32 is associated with temperature sensing element 23 and is connected with adding relay 33. Temperature transmitter 35 is associated with temperature sensing element 24 and is also connected with adding relay 33. Force bridge 29 and adding relay 33 are connected with force bridge 34 which is connected with a controller 36 which connects with valve 17.

The heat input to reboiler 14 can be determined as the product of steam flow in pounds per unit time and the heat per pound of steam removed in the reboiler. The mass flow of steam in pounds per unit time can be determined by multiplying the steam density by the volume rate of flow. Steam density $\rho$ can be expressed by the equation $$\rho = \frac{144P}{\mu RT}$$

wherein $P$ = steam supply pressure in p.s.i.a.
$T$ = steam supply temperature in degrees Rankine (degrees Fahrenheit plus 460)
$R$ = gas constant
$\mu$ = the correction factor for deviation from ideal gas The mass flow of the steam can be computed by the equation $$F_s = K_s \sqrt{\rho \Delta p}$$

wherein $F_s$ = steam flow in pounds per hour
$\Delta p$ = differential pressure across orifice
$\rho$ = density of steam
$K_s$ = flow coefficient of orifice meter The enthalpy of the steam in steam inlet line 16 can be determined from the temperature and pressure if the steam is superheated but is determined by a throttling calorimeter when the steam is below saturation. In the latter instance, the temperature in the calorimeter of the throttled steam is a function of the enthalpy.

In operation, the pressure sensed by element 19 is transmitted by transmitter 25 to adding relay 26 as a signal proportional thereto. The signal provided by 26a is proportional to atmospheric pressure and the two signals are added in relay 26 and the sum multiplied by a gain proportional to a ratio which represents $$\frac{144}{\mu R}$$

Thus, the output signal of relay 26 which is fed to force bridge 27 is proportional to $$\frac{144 P}{\mu R}$$

The signal transmitted from transmitter 28 to force bridge 27 is proportional to the differential pressure measured by orifice meter 20. A signal proportional to the temperature in degrees Fahrenheit measured by temperature sensing element 21 is transmitted by transmitter 30 to adding relay 31. Here an external signal provided through connection 31a and proportional to the number 460 is added to the signal representing the temperature in degrees Fahrenheit thus producing an output signal which is proportional to the absolute temperature degrees Rankine which is fed to force bridge 27. Force bridge 27 combines the signals from adding relays 26 and 31 and transmitter 28 to produce an output signal which is proportional to $$\frac{144 P}{\mu R T} \Delta P = \rho \Delta P$$

wherein $P$ = absolute pressure in pounds per square inch
$T$ = absolute temperature in degrees Rankine.

This signal is fed to force bridge 29 which produces an output signal proportional to $K_s \sqrt{\rho \Delta P}$. $K_s$ is a constant determined by the orifice coefficient, size of pipe 16, and size of orifice 20. The output of force bridge 29 then is proportional to the mass flow in pounds per hour of vapor flowing in pipe 16.

Since the steam is throttled in calorimeter 22 to atmospheric pressure, the measured temperature, $T_c$, as long as this temperature is above saturation temperature for atmospheric pressure, can be used to determine the enthalpy according to the equation:

enthalpy = 1150.4 plus $C_p$ ($T_c$ minus 212)

Adding relay 33 is adapted to modify the signal fed by transmitter 32 by subtracting an amount proportional to 212 and multiplying the result by a constant which represents $C_p$, specific heat of superheated steam at constant pressure in the operating range, and to add a signal proportional to 1150.4 and to subtract a signal by input 38 which may be a constant which is determined to be the average heat content of the condensate removed from reboiler 14 through pipe 18 or may be a signal transmitted by transmitter 35 which is proportional to the temperature measured by temperature sensing element 24 multiplied by a factor to convert to enthalpy of the condensate. Thus, the signal fed by adding relay 33 to force bridge 34 is proportional to the heat supplied per pound of steam to reboiler 14.

Force bridge 34 multiplies the signals from force bridge 29 and adding relay 33 to produce an output signal proportional to the amount of heat supplied to reboiler 14 per hour. This signal is fed to a controller 36, the set point, 37, of which may be manually adjusted or adjusted by one of the process variables related to tower 10, for example, overhead product analysis, feed analysis, etc.

In a preferred form of the invention, the described control system is operated by air pressure. For example, transmitters 25, 30, 32 and 35 can all supply air pressures proportional to the measured properties and the adding relays and force bridges, in turn, modify and supply air pressure signals. If air pressures are used, it is necessary to provide supply air to the various components but it has not been thought necessary to show such an air supply system since such systems are well known in the art and to show such a system here would simply complicate the drawing unnecessarily.

All of the various components, that is, the sensing elements, transmitters, adding relays, force bridges, controller valve, etc. are well known in the art and, therefore, details of their construction have not been shown here. For example, Taylor Transaire Pressure Transmitter No. 317RN, described in Taylor Instrument Company Brochure 2B100 of December 1952, may be used for pressure transmitter 25. Taylor Transmitter No. 317RG, also described in the above-mentioned brochure, may be used for temperature transmitters 30 and 35. The Taylor Transet Potentiometer Transmitter No. 700T, described in Taylor Instrument Company Brochure 2B300 of February 1957, may be used for temperature transmitter No. 32.

Adding relays 26, 31, and 33 may consist of the Foxboro M-56 Computing Relay, described in Foxboro Brochure 37-57a of September 12, 1956. The Sorteberg Force Bridge, described in Minneapolis-Honeywell Catalog No. C80-1 of September 1956, may be used for force bridges 27, 29 and 34. Foxboro Model M/40 Controller, described in Foxboro Bulletin 5A-10A of November 1955, may be used for controller 36. A suitable throttling calorimeter for use as component 22 is pictured on page 31 of the textbook entitled "Elements of Steam and Gas Power Engineering," by Potter and Calderwood, McGraw-Hill Book Company, 1920.

Although, in one important aspect of the invention, the system involves the use of proportional air pressures, it is also within the scope of the invention to practice the invention using electrical components and electrical signals. For example, Philbrick Electronic Computing Amplifiers, described in a 1956 brochure of George A. Philbrick Researches, Inc., 230 Congress Street, Boston 10, Mass., may be used instead of the previously specified pneumatic adding relays and force bridges.

With the above-described system installed on a 55 p.s.i.a. steam supply to a heat exchanger where the maximum steam pressure fluctuations are between 50 and 60 p.s.i.a. and the maximum temperature fluctuations between 285° F. and 320° F., and with the combined flow coefficient, $K_s$, of the orifice meter 20 and flow transmitter 28 associated therewith being 3400, R, the gas constant of steam is 85.81, the correction factor $\mu$ is determined by choosing a steam condition within the assumed limits of operation and equating $$\frac{\mu W R T}{P}$$

the volume calculated for 1 pound of steam, with the corresponding value given for specific volume in steam tables. For example, at 55 p.s.i.a. and 300° F., the specific volume is 7.947 cubic feet per pound. Then $$\frac{\mu WRT}{P} = \nu = 7.947$$

$$\frac{\mu(1.0)(85.81)(300°+460)}{144\ (55.0)} = 7.947$$

$$\mu = \frac{(7.947)(144)(55.0)}{(1.0)(85.81)(760)} = .96511$$

The heat given up by the steam in the exchanger, $\Delta hs$, can be expressed as follows:

$$\Delta hs = hs - hf$$

where $\Delta hs$ = heat given up by each pound of steam in the exchanger
$hs$ = enthalpy of the steam entering the exchanger
$hf$ = enthalpy of the condensate leaving the exchanger The enthalpy of the steam entering the exchanger can be determined by use of a throttling calorimeter, and can be expressed by the following equation:

$$hs = 1150.4 + Cps\ (Tc\ °F. - 212°\ F.)$$

where
1150.4 = enthalpy saturated steam at 14.7 p.s.i.a.
$Cps$ = constant pressure specific heat of superheated steam at 14.7 p.s.i.a.
$Tc$ = temperature of steam in the throttling calorimeter.

The total heat, $Ht$, given up in the exchanger can be expressed as follows:

$$Ht = F_s(hs - hf)$$
$$= F_s(\Delta hs)$$

If the steam pressure now drops to 50 p.s.i.a. and the steam is saturated and the pressure differential across the steam flow orifice is 6 p.s.i., the steam density is calculated as follows:

$$\rho = P/\mu RT$$
$$\rho = (144)(50)/(85.81)(.96511)(460+281)$$
$$\rho = .11732\#/ft.^3$$

where $\mu = .96511$.

The mass flow of steam is calculated as follows:

$$F_s = K_s\sqrt{\rho \Delta P}$$
$$= 3400\sqrt{(0.11732)(6)} = 2850\ lb./hr.$$

When 50 p.s.i.a. steam at 281° F. is throttled to atmospheric pressure, the steam temperature, $Tc$, in the throttling calorimeter is 260.07° F. $hs$ can be determined as follows:

$$hs = 1150.4 + Cps(Tc - 212°\ F.)$$
$$1150.4 + (.4838)(260.07 - 212) = 1150.4 + 23.26$$
$$= 1173.66\ B.t.u./\#\ of\ steam.$$

The enthalpy of the condensate is expressed by the following equation:

$$hf = 218.8 + C(Tf\ °F. - 250.33°\ F.)$$

where
$Tf$ = temperature of the steam condensate
$C$ = specific heat of condensate. (An average for the pressure and temperature range of operations.) For this example $C = 1.0217$
218.8 = enthalpy of saturated liquid at 250.33° F.

With a condensate temperature of 280.0° F.:

$$hf = 218.8 + 1.0217(280.0 - 250)$$
$$hf = 218.8 + 30.65$$
$$= 249.45$$

The heat given up in the exchanger by each pound of steam is expressed by the equation:

$$\Delta hs = hs - hf$$
$$\Delta hs = 1173.66 - 249.45 = 924.21\ B.t.u./\#\ of\ steam.$$

The total heat being given up by the steam per hour is expressed:

$$Ht = (F_s)(\Delta hs)$$
$$= (2850)(924.21)$$
$$= 2,630,000\ B.t.u./hr.$$

The methods described and illustrated above provide reasonable, practical accuracy for the calculation of $\Delta hs$ where the steam is superheated, saturated or contains as much as 3 percent moisture. However, the density calculation should be limited to superheated and saturated steam. Of course, where vapors other than steam are used, the various constants used will differ, but the operation of the system is not appreciably changed.

Reasonable variation and modification are possible within the scope of the foregoing disclosure, the drawing and the appended claims to the invention, the essence of which is that there are provided apparatus and method to determine accurately the heat content of a flowing stream of vapor by measuring all of the applicable properties of the stream necessary to a rigorous determination of the heat content and combining the measurements automatically in a manner to produce an indication and/or a control force which is a function of the heat content; method and apparatus to determine accurately the heat supplied by a condensing flowing stream to a heat exchanger by similar rigorous determination of heat content of the stream entering and leaving the heat exchanger, and method and apparatus for controlling the flow of a heating fluid in response to a rigorous determination of the heat supplied by the fluid.

I claim:
1. Fractionation apparatus comprising a fractionation tower, a reboiler operatively connected with said tower, steam supply means for supplying heat to said reboiler, means for maintaining constant the heat supplied to said reboiler by said steam, comprising means for measuring the temperature of said steam and producing a first signal proportional thereto, means for measuring the pressure of said steam and producing a second signal proportional thereto, an orifice in said steam supply means, means for measuring the differential pressure produced by the steam flowing through said orifice and producing a third signal proportional thereto, a throttling calorimeter communicating with said supply means, and adapted to throttle a portion of said steam continuously, means for measuring the temperature of said throttled steam and producing a fourth signal proportional thereto, means for determining the heat content of the condensate leaving said reboiler and producing a fifth signal proportional thereto, means for combining said first, second, third, fourth and fifth signals to produce a sixth signal which is proportional to the heat supplied by said steam to said heat exchanger, and means for controlling said steam supply means responsive to said sixth signal.

2. In the operation of a fractionation tower wherein heat is supplied to said tower by condensing a vapor, the method of controlling the heat supplied to said tower in a heat exchange zone by measuring the temperature of said vapor entering said zone and producing a first signal proportional thereto, measuring the pressure of said vapor entering said zone and producing a second signal proportional thereto, measuring the flow of said vapor entering said zone and producing a third signal proportional thereto, continuously throttling a portion of said vapor entering said zone to atmospheric pressure, measuring the temperature of said throttled portion and producing a fourth signal proportional thereto, measuring the temperature of the condensate leaving said zone and producing a fifth signal proportional thereto, combining said first, second, third, fourth and fifth signals to produce a sixth signal proportional to the heat supplied by said vapor to said tower in said zone, and controlling the flow of said vapor entering said zone responsive to said sixth signal.

3. An apparatus for determining and controlling the heat supplied by a flowing stream of vapor to a heat exchanger comprising a temperature sensing element adapted to measure the temperature of said vapor, a temperature transmitter operatively connected with said temperature element adapted to produce a first signal proportional to said temperature, an adding relay adapted to modify said second signal to produce a signal proportional to absolute temperature, a pressure measuring element communicating with said stream, a pressure transmitter operatively connected with said pressure element and adapted to produce a third signal proportional to said pressure, an adding relay adapted to modify said third signal to produce a fourth signal proportional to the absolute pressure of said stream, a flow meter adapted to measure the flow of said stream and to produce a fifth signal proportional to the square of said flow, a force bridge adapted to combine said fourth, fifth and second signals to produce a sixth signal proportional to the product of said fourth and fifth signals divided by said second signal, a second force bridge adapted to extract the square root of said sixth signal to produce a seventh signal, a throttling calorimeter communicating with said stream and adapted to throttle a portion of said vapor continuously, a temperature sensing element in said calorimeter, a temperature transmitter operatively connected with said temperature element in said calorimeter adapted to produce an eighth signal proportional to said calorimeter temperature, a temperature sensing element associated with the condensate of said stream leaving said heat exchanger, a temperature transmitter operatively connected with said tempertaure element associated with said condensate to produce a ninth signal proportional to said condensate temperature, a third adding relay adapted to combine said eighth and ninth signals to produce a tenth signal proportional to the enthalpy yielded by said vapor to said heat exchanger, a third force bridge adapted to combine said seventh and said tenth signals to produce an eleventh signal proportional to the heat supplied by said flowing stream of vapor to said heat exchanger, and means to control the rate of flow of said stream of vapor responsive to said eleventh signal.

4. Fractionation apparatus comprising a fractionation tower, a reboiler operatively connected with said tower, steam supply means for supplying heat to said reboiler, means for maintaining constant the heat supplied to said reboiler by said steam comprising means for measuring the temperature of said steam and producing a first signal proportional thereto, means for measuring the pressure of said steam and producing a second signal proportional thereto, an orifice in said steam supply means, means for measuring the differential pressure produced by the steam flowing through said orifice and producing a third signal proportional thereto, means to combine said first, second and third signals to produce a fourth signal proportional to the mass rate of flow of said steam, a throttling calorimeter communicating with said supply means and adapted to throttle a portion of said steam continuously, means for measuring the temperature of said throttled steam and producing a fifth signal proportional thereto, means for determining the heat content of the condensate leaving said reboiler and producing a sixth signal proportional thereto, means for combining said fourth, fifth and sixth signals to produce a seventh signal which is proportional to the heat supplied by said steam to said heat exchanger, and means to control said steam supply means responsive to said seventh signal.

5. In a process wherein heat is supplied to a heat exchange zone by condensing a vapor, the method of controlling the heat supplied to said zone by measuring the temperature of said vapor entering said zone and producing a first signal proportional thereto, measuring the pressure of said vapor entering said zone and producing a second signal proportional thereto, measuring the flow of said vapor entering said zone and producing a third signal proportional thereto, continuously throttling a portion of said vapor entering said zone to atmospheric pressure, measuring the temperature of said throttled portion and producing a fourth signal proportional thereto, measuring the temperature of the condensate leaving said zone and producing a fifth signal proportional thereto, combining said first, second, third, fourth and fifth signals to produce a sixth signal proportional to the heat supplied by said vapor to said zone, and controlling the flow of said vapor entering said zone responsive to said sixth signal.

6. An apparatus for determining and controlling the heat supplied by a flowing stream of vapor to a heat exchanger, comprising, a vapor supply means for supplying heat to said heat exchanger, and means to maintain constant the heat supplied to said heat exchanger by said vapor, comprising means for measuring the temperature of said vapor and producing a first signal proportional thereto, means for measuring the pressure of said vapor and producing a second signal proportional thereto, an orifice in said vapor supply means, means for measuring the differential pressure produced by the vapor flowing through said orifice and producing a third signal proportional thereto, a throttling calorimeter communicating with said supply means and adapted to throttle a portion of said vapor continuously, means for measuring the temperature of said throttle vapor and producing a fourth signal proportional thereto, means for determining the heat content of the condensate leaving said heat exchanger and producing a fifth signal proportional thereto, means for combining said first, second, third, fourth, and fifth signals to produce a sixth signal which is proportional to the heat supplied by said vapor to said heat exchanger, and means for controlling said vapor supply means responsive to said sixth signal.

References Cited in the file of this patent

UNITED STATES PATENTS

| 2,343,619 | Luhrs | Mar. 7, 1944 |
| 2,572,253 | Fellows et al. | Oct. 23, 1951 |
| 2,664,391 | Coulter | Dec. 29, 1953 |
| 2,689,932 | Hornfeck | Sept. 21, 1954 |
| 2,718,144 | Hornfeck | Sept. 20, 1955 |
| 2,754,053 | Howe et al. | July 10, 1956 |
| 2,917,437 | Kleiss et al. | Dec. 15, 1959 |
| 3,034,718 | Freitas et al. | May 15, 1962 |

OTHER REFERENCES

"Steam Tables," Combustion Engineering, Inc., New York, 3rd edition, copyright 1940, pages 36 and 37.

Keenan and Keyes: "Thermodynamic Properties of Steam," John Wiley and Sons, New York, 1956.

"Automatic Control," May 1958, vol. 7–8, pages 43–48.